2,898,225

Patented Aug. 4, 1959

2,898,225

IMAGE DISPLAY DEVICE

Thaddeus V. Rychlewski and Robert F. Wilson, Seneca Falls, N.Y., assignors, by mesne assignments, to Sylvania Electric Products Inc., Wilmington, Del., a corporation of Delaware No Drawing. Application December 31, 1957
Serial No. 706,250

5 Claims. (Cl. 117—33.5)

This invention relates to image display screens and more particularly to luminescent screens which are formed by vaporization techniques.

Luminescent screens for devices such as cathode ray tubes may be formed by vaporizing phosphor materials upon the glass viewing panel of the tube. Generally, in the vaporization process, it has been found necessary to heat the phosphor coated panel to a temperature of approximately 1000° C. in order to produce a screen having acceptable luminescence. This temperature is much too high for use with conventional cathode ray tube manufacturing techniques and it requires the adoption of expensive high temperature "hard glass" for the panel material. In order to reduce the processing temperatures of some types of evaporated luminescent screens, it has been proposed that a corrosive or toxic atmosphere containing a halogen and hydrogen sulfide be used either in the initial phosphor vaporization process or in the subsequent firing operation. However, the utilization of a corrosive atmosphere is expensive and difficult to handle in production and it tends to decrease the screen brightness.

Accordingly, an object of the invention is to reduce the aforementioned disadvantages and to improve the fabrication of evaporated luminescent screens.

A further object is to produce an evaporated luminescent screen at a temperature which allows the use of "soft glass" as the substrate upon which the luminescent material is deposited.

Another object is to alleviate the need for a corrosive or toxic atmosphere in the production of vaporized luminescent screens.

The foregoing objects are achieved in one aspect of the invention by the provision of a process for forming a luminescent screen wherein a salt is added to the phosphor or luminescent material prior to evaporation in a vacuum. Subsequently, the screen is heated in a vacuum or in air to a temperature substantially within the range of "soft glass" to produce a screen which is ion, photon and electron luminescent.

The luminescent materials used in the process may comprise cadmium sulfide, zinc cadmium sulfide, zinc cadmium selenide or a combination of these phosphors activated with silver and/or copper. The salts which are evaporated with the phosphor may comprise chlorides, bromides, iodides, sulfates, thio-sulfates, chlorates, etc. of such metals as lithium, barium, sodium and potassium.

In accordance with one aspect of the invention a luminescent screen may be formed by depositing a phosphor such as silver activated zinc cadmium sulfide into a suitable holder like a carbon boat along with a salt such as barium chloride. The boat containing these materials is then placed within an enclosure and spaced from the glass panel or substrate which is to be coated. The enclosure is subsequently evacuated and the phosphor material and salt are vaporized substantially concurrently by the energization of an electrical heater wire mounted within or adjacent to the boat to coat the panel. The vaporizing temperature in the immediate vicinity of the heater has been found to be approximately 1100° C.

After the coating operation, the glass panel or substrate are removed from the enclosure and placed in a furnace for firing at approximately 550° C. from about 10 minutes to an hour. The firing may occur in air or in a vacuum. The luminescent screen so produced is photon, ion, and electron luminescent and comprises a relatively smooth, substantially non-granular silver activated zinc cadmium sulfide layer which luminesces with a high level of brightness.

The function of the salt in this process is believed to reside in its ability to promote low temperature crystalization of the phosphors which would probably decompose if heated near their melting points. The firing temperature utilized in the process and the firing time depends upon the materials being treated. It has been found that the time varies from several minutes to two hours while the optimum temperature may be from 400° C. to 600° C. This temperature span is substantially within the "soft glass" and conventional cathode ray tube processing ranges so that the method described herein is well adapted to the utilization of automatic production techniques.

It has been found that a very bright orange luminescing silver activated zinc cadmium sulfide having a 50:50 ratio of cadmium and zinc may be produced by adding 5 percent by weight of barium chloride to the phosphor and firing the evaporated screen at 550° C. for about an hour. A lower firing temperature, e.g. 450° C., can be used with the salt comprising 5 percent barium chloride and 2.5 percent lithium chloride. Also, it has been found that a bright yellow luminescent screen can be obtained by vaporizing 5 percent by weight of potassium chloride with the phosphor and subsequently firing at approximately 550° C. The luminescent color is determined primarily by the initial zinc:cadimum ratio and the potassium chloride salt does not appear to affect this color. However, barium and barium-lithium salts tend to increase the wave length of the luminescent colors.

The process described herein for forming image display screens useable in devices such as cathode ray tubes is adapted for automatic production and allows the utilization of temperatures within the range of "soft glass." In addition, the screen produced by this process has a high level of brightness and a smooth surface which facilitates the direct coating thereof, if desired, of other screen layers such as one of aluminum or an indexing material for purposes well known in the art.

Although several embodiments of the invention have been shown and described, it will be apparent to those skilled in the art that various changes and modifications may be made therein without departing from the scope of the invention as defined by the appended claims.

What is claimed is:

1. A process of forming a luminescent screen upon a glass substrate comprising the steps of heating a phosphor selected from the group consisting of cadmium and zinc cadmium sulfide and selenide together with a salt to vapor deposit the phosphor on said substrate, and subsequently firing the phosphor to promote the luminescent properties thereof.

2. A process of forming a luminescent screen upon a glass substrate comprising the steps of heating a copper activated phosphor selected from the group consisting of cadmium and zinc cadmium sulfide and selenide together with a salt to vapor deposit the phosphor on said substrate, and subsequently firing the phosphor to promote the luminescent properties thereof.

3. A process of forming a luminescent screen upon a glass substrate comprising the steps of heating a silver activated phosphor selected from the group consisting of cadmium and zinc cadmium sulfide and selenide together with a salt to vapor deposit the phosphor on said substrate, and subsequently firing the phosphor to promote the luminescent properties thereof.

4. A process of forming a luminescent screen upon a glass substrate comprising the steps of heating a phosphor selected from the group consisting of cadmium and zinc cadmium sulfide and selenide together with a salt to vapor deposit the phosphor on said substrate, and subsequently firing the phosphor at a temperature below 600° C. to promote the luminescent properties thereof.

5. A process of forming a luminescent screen upon a glass substrate comprising the steps of heating a phosphor in a vacuum selected from the group consisting of cadmium and zinc cadmium sulfide and selenide together with a salt to vapor deposit the phosphor on said substrate, and subsequently firing the phosphor in air to promote the luminescent properties thereof.

References Cited in the file of this patent
UNITED STATES PATENTS

| | | |
|---|---|---|
| 2,600,579 | Ruedy et al. | June 17, 1952 |
| 2,672,451 | Wollentin et al. | Mar. 16, 1954 |
| 2,685,530 | Cusano et al. | Aug. 3, 1954 |
| 2,732,312 | Young | Jan. 24, 1956 |
| 2,732,313 | Cusano et al. | Jan. 24, 1956 |
| 2,789,062 | Cusano et al. | Apr. 16, 1957 |